United States Patent
Mikuteit

(10) Patent No.: US 7,787,837 B2
(45) Date of Patent: Aug. 31, 2010

(54) SYSTEMS AND METHODS FOR AN RF NULLING SCHEME IN RFID

(75) Inventor: Eric Mikuteit, San Diego, CA (US)

(73) Assignee: Neology, Inc., Poway, CA (US)

( * ) Notice: Subject to any disclaimer, the term of this patent is extended or adjusted under 35 U.S.C. 154(b) by 883 days.

(21) Appl. No.: 11/531,988

(22) Filed: Sep. 14, 2006

(65) Prior Publication Data

US 2007/0060075 A1    Mar. 15, 2007

Related U.S. Application Data

(60) Provisional application No. 60/717,013, filed on Sep. 14, 2005.

(51) Int. Cl.
*H04B 1/04* (2006.01)
*H04B 1/10* (2006.01)

(52) U.S. Cl. ............... 455/114.2; 455/283; 455/296

(58) Field of Classification Search .......... 455/41.1, 455/41.2, 25, 63.1, 78, 278.1, 296, 303, 283, 455/114.1, 114.2, 126, 304; 340/10.1
See application file for complete search history.

(56) References Cited

U.S. PATENT DOCUMENTS

| 5,019,793 A | 5/1991 | McNab |
| 6,566,997 B1 | 5/2003 | Bradin |
| 2001/0001758 A1* | 5/2001 | Greeff et al. .............. 455/41 |
| 2006/0033607 A1 | 2/2006 | Bellantoni |

OTHER PUBLICATIONS

International Search Report for PCT/US06/35900, Feb. 2007.

* cited by examiner

*Primary Examiner*—Nguyen Vo
(74) *Attorney, Agent, or Firm*—Procopio Cory Hargreaves & Savitch LLP; Noel C. Gillespie

(57) ABSTRACT

Systems and methods for an RF nulling scheme are provided. An RF nulling scheme can minimize the level of unwanted RF signal reflections entering the receiver without attenuating the desired signal response from an RFID tag. In one aspect of the RF nulling scheme a synthesizer signal can be split between a main path and a nulling path. In the nulling path the signal from the splitter can be routed through an electronically variable phase shifter and variable gain amplifier to create a nulling signal. The nulling signal can cancel the unwanted reflected signal. The phase or amplitude of the nulling signal can then be adjusted to improve cancellation as necessary.

25 Claims, 4 Drawing Sheets

SYSTEMS AND METHODS FOR AN RF NULLING SCHEME IN RFID

RELATED APPLICATION INFORMATION

This application is based upon and claims the benefit of priority from U.S. Provisional Patent Application Ser. No. 60/717,013, filed Sep. 14, 2005, the entire contents of which are incorporated herein by reference.

BACKGROUND

1. Field of the Invention

The present embodiments described herein relates generally to RFID systems, and more particularly to systems and methods for RF nulling within an RFID system.

2. Background of the Invention

FIG. 1 is a diagram illustrating an exemplary RFID system 100. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transmit signal 108 and radio receive signal 112, respectively. Exchange of data can be accomplished via electromagnetic or electrostatic coupling in the RF spectrum in combination with various modulation and encoding schemes. RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. a battery. Passive RFID tags power themselves by rectifying the RF signal emitted by the RF scanner. Consequently, the range of transmit signal 108 determines the operational range of RFID tag 110.

RF transceiver 104 transmits RF signals 108 to RFID tag 110, and receives RF signals 112 from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags 110, that are within range of the RF field emitted by antenna 106. Together, RF transceiver 104 and digital electronics 114 comprise interrogator 102. Finally, digital electronics 114 can be interfaced with an integral display and/or provide a parallel or serial communications interface to a host computer or industrial controller, e.g. host computer 116.

Generally, RFID systems 100 must receive a backscatter signal 112 from tag 110 while transmitting signal 108. Simultaneous transmission and reception can cause high levels of RF energy to enter the receiver, ultimately limiting the receiver sensitivity. Existing system designs attempt to solve this problem by either minimizing the signal reflections back into the receiver or by using separate transmit and receive antennas. Minimizing signal reflections via component selection has practical limitations. For example, it can be difficult to perfectly match impedance because of variability in the manufactured components used in a device or system. These impedance mismatches can cause reflections. Further, using separate antennas increases the system cost and requires additional space.

SUMMARY

An RF nulling scheme can minimize the level of unwanted RF signal reflections entering the receiver without attenuating the desired signal response from an RFID tag. In one aspect of the RF nulling scheme a synthesizer signal can be split between a main path and a nulling path. In the main path, the signal can be amplified and routed through a circulator to an antenna. In this way the signal can be transmitted, e.g., to any RFID tags within range.

Reflections from the circulator, cable, and antenna can combine with any responding RFID tag's backscatter response to create a large composite RF signal at the receiver. As discussed above, this large composite RF signal can ultimately limit the receiver sensitivity.

In one aspect of the nulling path, the signal from the splitter can be routed through an electronically variable phase shifter and variable gain amplifier to create a nulling signal. A coupler can combine the large composite RF signal with the nulling signal. The nulling signal can be of equal amplitude to the reflected signal, but shifted 180 degrees out of phase. Thus the nulling signal can cancel the reflected signal. In other words, the output of the RF coupler can contain the incoherent RFID tag response and what is left of the nulled coherent, undesired RF signal. This signal can be routed through a detector to provide feedback to the processor about how well the reflected signal is being cancelled. The phase or amplitude of the nulling signal can then be adjusted to improve cancellation if necessary.

The variable phase control can ensure that the nulling signal is, at least approximately, 180 degrees out of phase with the undesired signal. Without phase control, the signals could constructively add further degrading receiver sensitivity. If the nulling signal is 180 degrees out of phase it can destructively add to the undesired signal. Variable gain can be used to ensure that the nulling signal is the right amplitude to adequately null the undesired signal. Without variable gain there may not be enough signal in a large reflection situations to adequately null, or, conversely too much signal in small reflection situations.

In another aspect, using an RF coupler can minimize the insertion loss on the desired RF signal, yet permit nulling of the undesired signal. This can keep the desired signal maximized, e.g. the signal reflected by any RFID tags while minimizing the undesired signal, thereby improving receiver sensitivity.

In another aspect, without some way to couple off the resultant signal and detecting the RF amplitude of the undesired signal there is no way to determine where to set the gain of the variable amplifier and phase of the phase shifter. A detector can provide feedback on how well the undesired signal is being eliminated. The detector can also couple the desired signal to the rest of the receiver circuitry.

In yet another aspect, because gain and/or phase may need to be set to null the undesired RF signal, there will have to be some intelligence in the loop. Periodically during operation, the processor can have an algorithm that cancels the receiver RF signal at each frequency of use and at each antenna port. A look up table can be maintained to provide proper settings. The processor can perform periodic checks to insure the received RF signal is within an acceptable window, thereby maintaining good receiver sensitivity. In other words the processor can perform periodic checks to ensure sufficient cancellation to maintain good receiver sensitivity.

These and other features, aspects, and embodiments of the invention are described below in the section entitled "Detailed Description."

BRIEF DESCRIPTION OF THE DRAWINGS

For a more complete understanding of the systems and methods described herein, and the advantages thereof, reference is now made to the following descriptions taken in conjunction with the accompanying drawings, in which.

DETAILED DESCRIPTION

Figure 1:
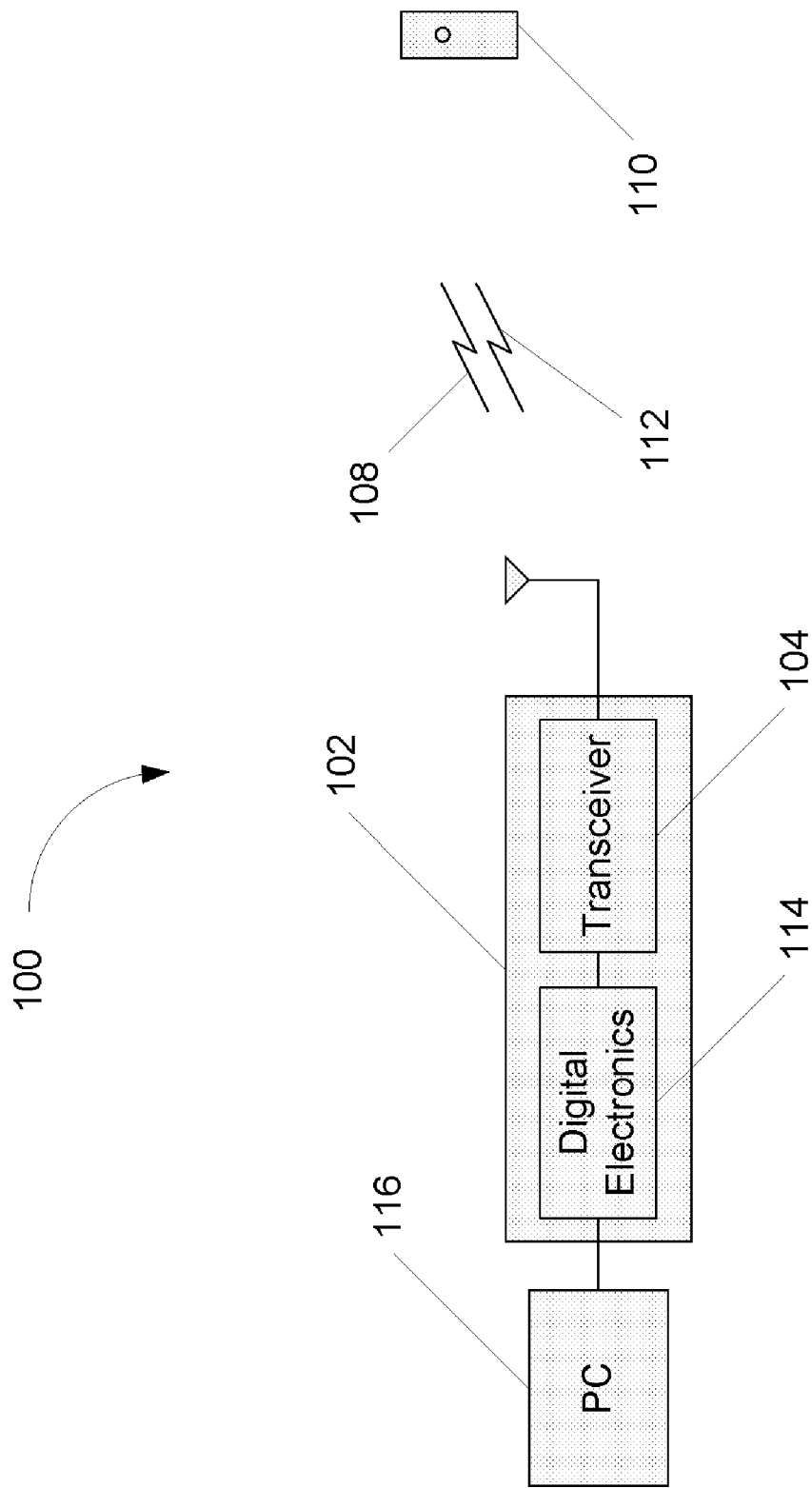
FIG. 1 is a diagram illustrating an exemplary RFID system.
Figure 2:
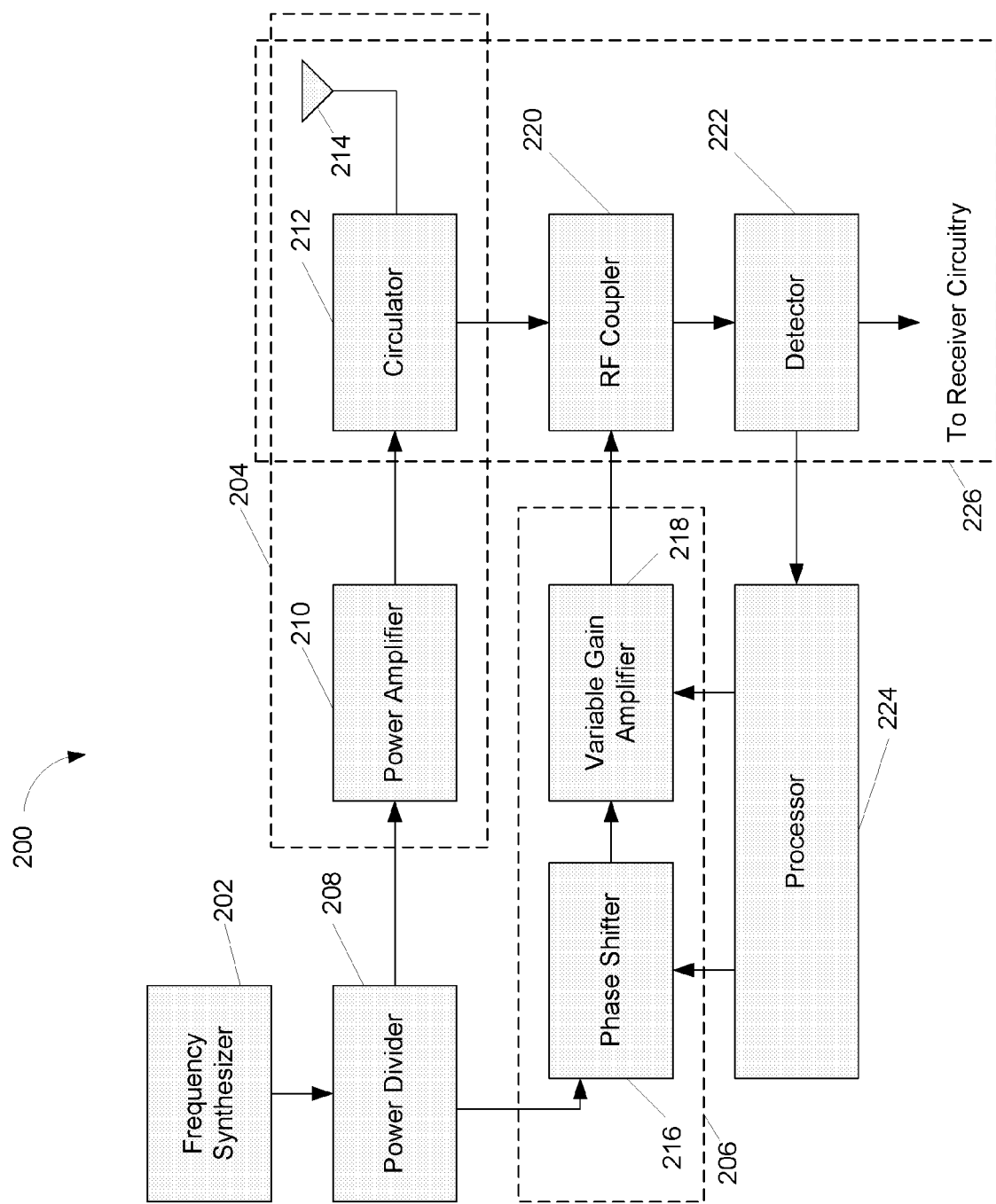
FIG. 2 is a diagram illustrating an example RFID system receiver in accordance with one embodiment.

FIG. 2 is a diagram illustrating an example RFID System Receiver 200 in accordance with one embodiment. In this embodiment, an RF nulling scheme can be used to minimize the level of reflected RF signals entering a receiver without attenuating, or at least minimally attenuating any desired signal response from an RFID tag.

A transmit signal from synthesizer 202 can be split between a main path 204 and a nulling path 206 using an RF power divider 208. In main path 204, a main path signal can be amplified, using a power amplifier 210. The main path signal can be one signal output from RF power divider 208. After amplification the main path signal can be routed through a circulator 212 to an antenna 214. Reflections from circulator 212, cable and antenna 214 can combine with an RFID tag's backscatter response to create a large composite RF signal at the receiver.

A nulling path signal can be another output from RF power divider 208. The nulling path signal can be routed through nulling path 206, which can include a variable phase shifter 216 and a variable gain amplifier 218. Nulling path 206 can output a nulling signal that can be combined with the composite signal using coupler 220. Thus, the output of the RF coupler 220 can contain the incoherent RFID tag response and what is left of the nulled coherent, undesired RF signal. This signal can be routed through a detector 222 to provide feedback to a processor 224. Detector 222 can, in one embodiment, be a coupler/detector and can couple the combined signal to the rest of the receiver circuitry.

The variable phase control provided by phase shifter 216 can ensure that the nulling signal is 180 degrees out of phase with the composite signal. Without phase control, the signals could constructively add, further degrading receiver sensitivity. Additionally, without variable gain there may not be enough signal in large reflection situations or, conversely, too much signal in small reflection situations. Thus, without variable gain it can be impossible to adequately null the undesired signal. It will be understood that the order of phase shifter 216 and the variable amplifier 218 can be switched. In other words the nulling path signal can, alternatively, be amplified and then phase shifted.

Determining if the undesired signal has been adequately or sufficiently cancelled can be based on many different criterion. For example, the magnitude of the unwanted signal can be determined using a detector. An acceptable magnitude of the unwanted signal can be based on, e.g., an acceptable signal to noise ratio, an acceptable bit error rate, frame error rate, etc. Acceptable levels of cancellation can vary from implementation to implementation, and thus are dependent on the specific implementation. Thus, for a given system, sufficient cancellation can be determined by selecting a level of cancellation that allows the system to receive signals transmitted from a tag with an acceptable error rate.

Because gain and/or phase may need to be adjusted to null the RF signal, it can be necessary to have a processor 224 or other logic to process the feedback and control the phase shifter 216 and/or variable gain amplifier 218. Examples including processor 224 will be discussed herein, however, it will be understood that other types of control logic can be used. Thus processor 224 can include a microprocessor, memory, digital logic, FPGAs, CPLDs, analog circuitry, etc.

Processor 224 can have an algorithm that controls the phase and/or amplitude of the nulling signal to cancel the undesired portion of the composite signal. Cancellation can occur, for example, at each frequency used by the transmit signal, at each antenna port in a multiple antenna system, etc.

The amplitude and/or phase of an undesired signal, e.g., caused by reflection of a transmit signal, can vary with frequency. Thus it can be desirable to select setting for phase shifter 216 and/or variable gain amplifier 218 based on the specific frequency used. In systems that use multiple frequencies it can be necessary to determine setting for phase shifter 216 and/or variable gain amplifier 218 that are acceptable for each frequency used. This can be done, for example, by optimizing the settings for one frequency used and then verifying that those settings will work for each of the other frequencies.

Alternatively, if an acceptable range of settings can be determined for each frequency and these ranges of settings have some overlap then settings within this overlap can be selected. For example, assume that a system uses two frequencies, $f_1$ and $f_2$. Further assume that at $f_1$ an acceptable range of phase adjustments that can adequately cancel the undesired signal is a 50 to 55 degree phase adjustment. In other words, at $f_1$, a 50 to 55 degree adjustment will cause the nulling signal to be approximately 180 degrees out of phase with the undesired signal.

Also assume that, at $f_2$, the acceptable range is 47 to 52 degrees of phase adjustment. Thus 50 degrees of phase adjustment can be selected because 50 degrees is within the ranges for both $f_1$ and $f_2$. It will be understood that the ranges will not always overlap. Thus, it can be necessary to pick phase and/or amplitude adjustments that are not optimal for any frequency used, but are close enough to provide some level of improvement for all of the frequencies used.

Cancellation can also occur at each antenna port, e.g., in devices that use multiple antennas. Again, as with multiple frequencies discussed above, when multiple antenna ports are used it can be necessary to pick phase and/or amplitude adjustments that are not optimal for any antenna port used, but are close enough to provide some level of improvement for all of the ports used. For example, assume that setting variable gain amplifier 218 to a gain of 0.5 will provide adequate cancellation of the undesired signal at a first antenna port, assuming that the correct phase is selected. Further assume that a gain of 0.7 will provide adequate cancellation of the undesired signal at a second antenna port. A gain of 0.6 can, for example, be selected so that some improvement can be provided to each antenna port. It will be understood that if a range of amplification values can provide adequate cancellation then 0.6 might be within that range and thus provide adequate cancellation for both antenna ports.

It will be understood that these are only examples. Many different ways of selecting amplitude and/or phase adjustment between multiple frequencies, multiple antenna ports, etc. are possible. For example, one frequency can be more important than another. In this example, it can be more important to optimize for this frequency. Alternatively, one antenna port can be more important than another, thus the more important antenna port can be optimized.

In one embodiment multiple frequencies and multiple antenna ports can be used. In this embodiment it can be necessary to optimize for both frequency and antenna port. In these cases priorities between different frequencies and different antenna ports can vary from implementation to implementation, thus exactly how phase and/or gain is selected can vary from system to system.

It will be understood that these principles can be applied multiple times in a given system. For example, the one phase shifter 216 and one variable gain amplifier 218 can be used with one antenna 214 and another phase shifter and variable gain amplifier can be used with another antenna.

Further, a look up table can be maintained to provide proper settings. For example, a table can be generated that indicates what phase and/or amplification, or range of these settings, should be used for a given transmit frequency. These settings can then be checked when processor 224 performs periodic checks to insure the received RF signal is within an acceptable window, thereby maintaining good receiver sensitivity.

Figure 3:
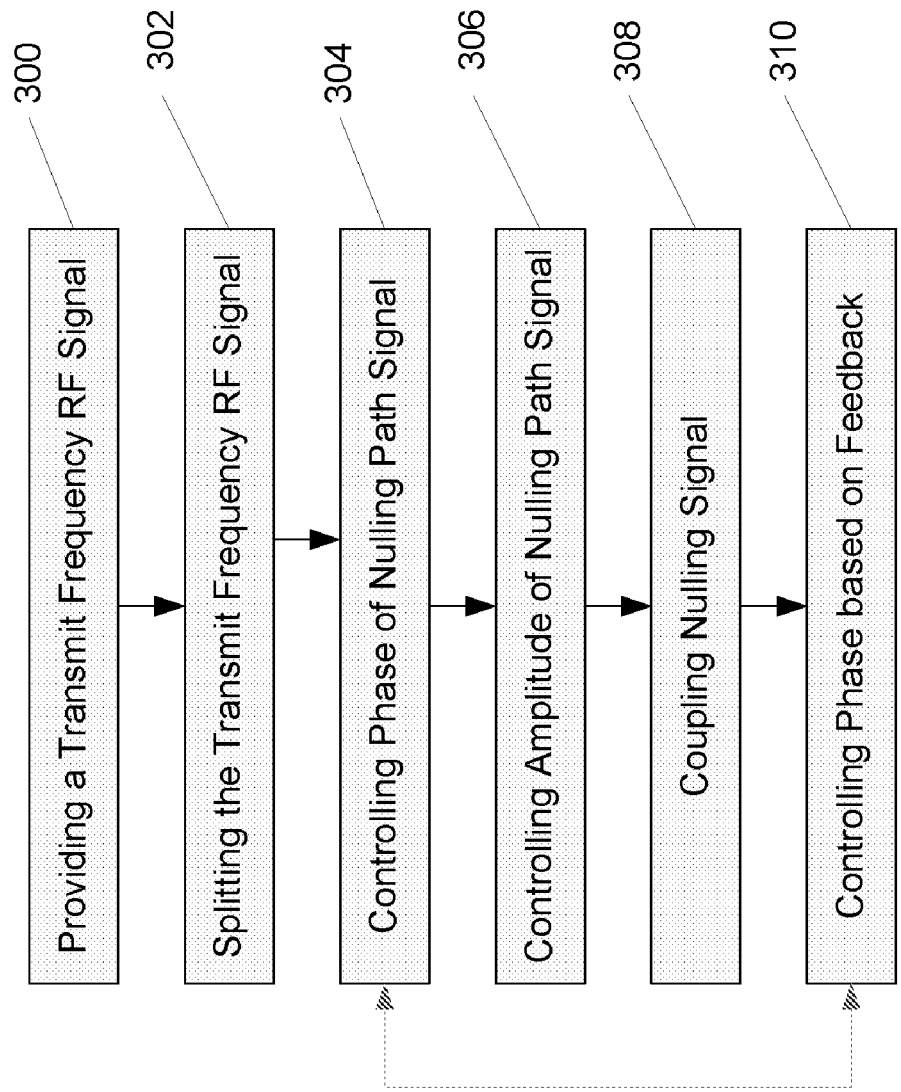
FIG. 3 is a flowchart illustrating an example method of RF nulling that can use the system of FIG. 2 in accordance with one embodiment.

FIG. 3 is a flowchart illustrating an example method of RF nulling that can use the system of FIG. 2 in accordance with one embodiment. In step 300 the transmit signal can, e.g., be provided by frequency synthesizer 202. In step 302 the transmit signal can be split into the nulling signal and the main signal, e.g., using RF power divider 208. The nulling signal can be directed to nulling path 206 while the main signal can be directed to main path 204.

In step 304 the phase of the nulling signal can be controlled, e.g., using phase shifter 216. In step 306 the amplitude of the nulling signal can be controlled, e.g., using variable gain amplifier 218. As discussed above, it will be understood that the order of phase shifter 216 and variable gain amplifier is not critical.

The received RF signal can include, e.g., a response from an RFID tag and a reflection of the signal that the RFID system receiver has transmitted, referred to above, as the undesired signal. The nulling signal can be coupled with the received RF signal in step 308. The nulling signal can be approximately the amplitude of the unwanted signal and approximately 180 degrees out of phase with the unwanted signal. Thus, the nulling signal can cancel, at least in part, the unwanted signal.

The amplitude of the undesired signal can be measured at RF detector 222. In this way the detector can provide feedback that can indicate how well the undesired signal is being eliminated. In step 310 the feedback can be used to control phase, amplitude, or both. In other words, feedback can be used to determine if any changes should be made to the current phase, amplitude or both, e.g., by changing control signals to phase shifter 216, variable gain amplifier 218, or both.

It should be noted that the undesired signal can comprise leakage from transmit, or main path 204 to receive path 226, unintended reflections from external objects, or both. Accordingly, changes, e.g., in the amplitude of the main path signal can effect the undesired signal. When this happens, the compensation provided via the nulling path signal may not be adequate, or it may be excessive. In which case, detector 222 should detect that the compensation is not optimal an cause the phase and/or amplitude of the nulling path signal to change via the feedback provided via the detector.

Figure 4:
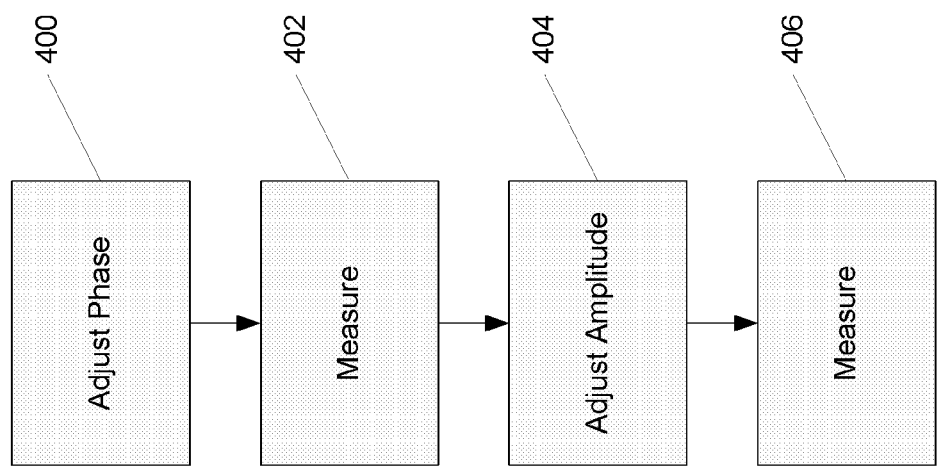
FIG. 4 is a flowchart illustrating another example method of RF nulling that can use the system of FIG. 2 in accordance with one embodiment.

FIG. 4 is a flowchart illustrating another example method of RF nulling. The example of FIG. 4 can use the system of FIG. 2 in conjunction with the methods discussed above with respect to FIG. 3 in accordance with one embodiment. In this example, phase can be adjusted in step 400, e.g., using phase shifter 216. The phase can be adjusted to match the phase of the nulling signal to the undesired signal.

In step 402, phase can be measured, for example, processor 224 can measure a signal coupled off of RF detector 222. In this way the detector can provide feedback that can indicate how well an undesired signal is being eliminated. It will be understood that processor 224 can measure the signal by, e.g., reading an output of an RF measuring device, and that the RF measuring device can be internal or external to processor 224. In this example, the measurement of step 402 can indicate the effects of the adjustment to phase of step 400.

In step 404, amplitude can be adjusted, e.g., using a variable gain amplifier 218. Similar to step 402, in step 404 amplitude can be measured, e.g., processor 224 can measure a signal coupled off of RF detector 222. This measurement can also use an RF measuring device that can be internal or external to processor 224. Again, in this way the detector can provide feedback that can indicate how well an undesired signal is being eliminated. In this example, the measurement of step 404 can indicate the effects of the adjustment to amplitude of step 404.

It will be understood that no order of steps should be implied by the order shown in FIG. 4. In one embodiment, the steps can proceed in the order shown, i.e., 400, 402, 404, and 406. In other embodiments a different order for the steps can be used. For example, in one embodiment a measurement 402 can be followed by a phase adjustment 400 and an amplitude adjustment 404, followed by a measurement 406. In this way the effect of the adjustments 400 and 406 can be determined by comparing the measurement 402 to the measurement 406.

In another embodiment a phase adjustment 400 and an amplitude adjustment 404 can be followed by a measurement 406. In other words, one measurement 406 can occur for each phase 400 and amplitude 404 adjustment. Thus, step 402 can be eliminated. This can be used, for example, in systems where the effects of changes to amplitude 404 and/or phase 400 are well known, such that a comparison before and after the changes is not necessary. This can reduce the number of steps necessary. In systems that do not have enough processor bandwidth to perform all the steps shown in FIG. 4 this can be useful. For example, steps can be eliminated where processor 224 is busy performing other tasks or processor 224 is too slow to perform all of the steps.

In another embodiment measurements can be taken before and after each adjustment 400 and 404. For example, a measurement 402 can be taken followed by a phase adjustment 400. After the phase adjustment 400 another measurement 406 can be taken. In this way the effect of the phase adjustments 400 alone can be determined by comparing the measurement 402 to the measurement 406. Further, a measurement 402 can be taken followed by an amplitude adjustment 404. After amplitude adjustment 404 another measurement 406 can be taken. In this way the effect of amplitude adjustment 404 alone can be determined by comparing the measurement 402 to the measurement 406. As will be understood from the examples above that many different combinations of measurements 402 and 406 and phase and amplitude adjustments 400 and 404 can be used.

While the systems and methods described herein can, reduce or minimize signal reflections without using multiple antennas, it will be understood that multiple antennas can be used in conjunction with these systems and methods. In some systems, multiple antennas can, for example, be used to further minimize signal reflections, to provide improved receiver performance by selecting the best antenna available in a multiple antenna system, to improve signal to noise ratio, both in terms of background noise and/or noise from unwanted reflection, or for any other reason that multiple antenna systems are used.

Additionally, the systems and methods described herein can, in some embodiments, be used to minimize signal reflection beyond what can be achieved using component selection alone. It will be understood, however, that some component selection will often be necessary to achieve an acceptable cancellation of any signal reflection within any given RFID system receiver. Thus, embodiments that include component selection in conjunction with the systems and methods described herein are specifically contemplated.

While certain embodiments of the inventions have been described above, it will be understood that the embodiments described are by way of example only. Accordingly, the inventions should not be limited based on the described embodiments.

What is claimed is:

1. An RFID receiver comprising:
    a nulling path circuit configured to create a phase shifted, amplitude controlled nulling signal, the nulling path circuit comprising:
        a phase shifter configured to control the phase of a nulling signal, and
        a variable gain amplifier coupled with the phase shifter, the variable amplifier configured to control the amplitude of the nulling signal;
    an RF coupler coupled to the phase shifter and the variable gain amplifier, the RF coupler configured to combine the nulling signal and a receive signal, the receive signal comprising an undesired signal, in such a manner so as to provide at least partial cancellation of the undesired signal;
    an RF detector coupled to the RF coupler, the RF detector configured to detect whether there is sufficient cancellation of the undesired signal and provide feedback;
    a processor coupled to the phase shifter, the variable gain amplifier, and the detector, the processor configured to control the phase shifter and the variable gain amplifier based on the feedback provided; and
    an RF power divider coupled to a transmit frequency synthesizer, the phase shifter, and the variable gain amplifier, the RF power divider configured to split a transmit signal into a main path signal and the nulling signal.

2. The RFID receiver of claim 1, wherein the undesired signal comprises leakage from a transmission path to a receive path.

3. The RFID receiver of claim 1, wherein the undesired signal comprises unintended reflections from an external source.

4. The RFID receiver of claim 1, wherein the undesired signal comprises both leakage from a transmission path to a receive path and unintended reflections from an external source.

5. The RFID receiver of claim 1, wherein the transmit frequency synthesizer is coupled to the phase shifter and the variable gain amplifier, and is configured to provide the transmit signal.

6. The RFID receiver of claim 1, further comprising a power amplifier coupled to the RF power divider and configured to control the amplitude of the main path signal.

7. The RFID receiver of claim 1, further comprising a circulator coupled to an RF coupler, a phase shifter, and a variable gain amplifier, the circulator configured to couple the main path signal to an antenna.

8. The RFID receiver of claim 1, wherein the nulling path circuit comprises a single device.

9. The RFID receiver of claim 1, wherein the RFID receiver is included in an RFID reader.

10. The RFID receiver of claim 1, wherein the processor controls the phase shifter and the variable gain amplifier such that sufficient cancellation of the undesired signal is provide for multiple transmit frequencies.

11. The RFID receiver of claim 1, wherein the processor controls the phase shifter and the variable gain amplifier such that sufficient cancellation of the undesired signal is provide for multiple antenna ports.

12. A method of receiving a signal from an RFID tag comprising:
    splitting a transmit RF signal from a frequency synthesizer into a main path signal and a nulling path signal at a power divider;
    controlling the phase of the transmit RF signal in the nulling path;
    controlling the amplitude of the transmit RF signal in the nulling path, thereby creating a phase shifted, amplitude controlled nulling signal;
    coupling the nulling signal with a receive RF signal, the receive RF signal comprising an undesired signal, thereby providing at least partial cancellation of the undesired signal;
    sampling the combined received RF signal and nulling signal to determine whether the undesired signal has been sufficiently cancelled;
    generating feedback indicating whether the undesired signal has been sufficiently cancelled; and
    adjusting at least one of the phase or amplitude of the RF signal based on the feedback.

13. The method of claim 12, further comprising controlling the amplitude of the main path signal.

14. The method of claim 12, further comprising routing an amplitude controlled main path signal to an antenna.

15. The method of claim 12, wherein the steps are continually repeated.

16. The method of claim 12, further comprising controlling the phase and the amplitude of a nulling signal such that sufficient cancellation of the undesired signal is provide for multiple transmit frequencies.

17. The method of claim 12, further comprising controlling the phase and the amplitude of a nulling signal such that sufficient cancellation of the undesired signal is provide for multiple antenna ports.

18. An RFID system, comprising
an RFID receiver, the RFID receiver comprising:
- a nulling path circuit configured to create a phase shifted, amplitude controlled nulling signal, the nulling path circuit comprising:
  - a phase shifter configured to control the phase of a nulling path input signal, and
  - a variable gain amplifier coupled with the phase shifter, the variable amplifier configured to control the amplitude of the nulling signal;
- an RF coupler coupled to the phase shifter and the variable gain amplifier, the RF coupler configured to combine the nulling signal and a receive signal, the receive RF signal comprising an undesired signal, in such a manner as to provide at least partial cancellation of the undesired signal;
- an RF detector coupled to the RF coupler, the RF detector configured to detect whether there is sufficient cancellation of the undesired signal and provide feedback; and
- a processor coupled to the phase shifter, the variable gain amplifier, and the detector, the processor configured to control the phase shifter and the variable amplifier based on the feedback provided;
- an RFID tag configured to receive an RF signal and backscatter modulate the RF signal with information; and
- an RF power divider coupled to a frequency synthesizer, the phase shifter, and the variable gain amplifier, the RF power divider configured to split a transmit signal into a main path signal and the nulling signal.

19. The RFID system of claim 18, wherein the transmit frequency synthesizer is coupled to the phase shifter and the variable gain amplifier, and the frequency synthesizer is configured to provide the transmit signal.

20. The RFID system of claim 18, wherein the RFID receiver further comprises a power amplifier coupled to the RF power divider and configured to control the amplitude of the main path signal.

21. The RFID system of claim 18, wherein the RFID receiver further comprises a circulator coupled to an RF coupler, a phase shifter, and a variable gain amplifier, the circulator configured to couple the main path signal to an antenna.

22. The RFID system of claim 18, wherein the RFID receiver further comprises the nulling path circuit implemented in a single device.

23. The RFID system of claim 18, wherein the RFID receiver is included in an RFID reader.

24. The RFID system of claim 18, wherein the RFID receiver processor controls the phase shifter and the variable gain amplifier such that sufficient cancellation of the undesired signal is provide for multiple transmit frequencies.

25. The RFID system of claim 18, wherein the RFID receiver processor controls the phase shifter and the variable gain amplifier such that sufficient cancellation of the undesired signal is provide for multiple antenna ports.

* * * * *